Figure 1:
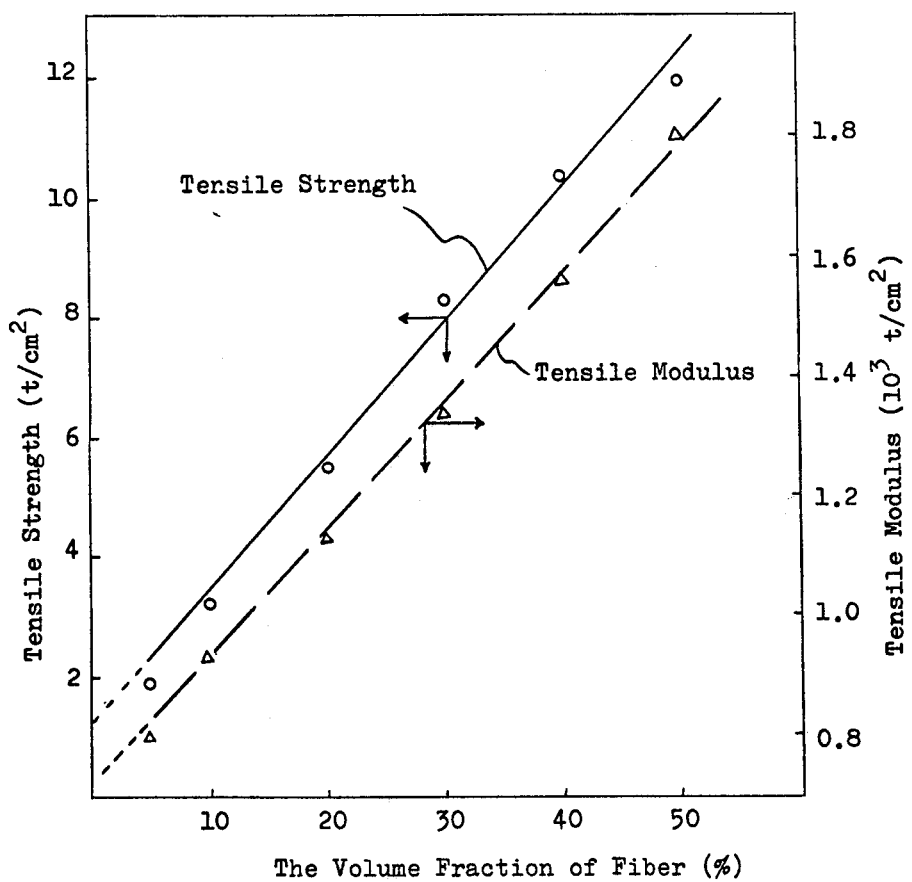

United States Patent

Horikiri et al.

[11] 4,152,149
[45] May 1, 1979

[54] COMPOSITE MATERIAL COMPRISING REINFORCED ALUMINUM OR ALUMINUM-BASE ALLOY

[75] Inventors: Shozo Horikiri, Amagasaki; Yasuaki Abe, Toyonaka, both of Japan

[73] Assignee: Sumitomo Chemical Company, Ltd., Osaka, Japan

[21] Appl. No.: 762,294

[22] Filed: Jan. 25, 1977

Related U.S. Application Data

[63] Continuation of Ser. No. 548,022, Feb. 7, 1975, abandoned.

[30] Foreign Application Priority Data

Feb. 8, 1974 [JP] Japan .................................. 49-16436

[51] Int. Cl.$^2$ ............................................ C22C 21/00
[52] U.S. Cl. .................................... 75/138; 75/142
[58] Field of Search ............... 75/138, 139, 140, 141, 75/142, 143, 144, 146, 147, 148

[56] References Cited

U.S. PATENT DOCUMENTS

| 2,793,949 | 5/1957 | Imich | 75/138 |
|---|---|---|---|
| 3,098,723 | 7/1963 | Micks | 75/138 |
| 3,600,163 | 8/1971 | Badia et al. | 75/138 |
| 3,753,694 | 8/1973 | Badia et al. | 75/138 |

Primary Examiner—R. Dean
Attorney, Agent, or Firm—Birch, Stewart, Kolasch & Birch

[57] ABSTRACT

A composite material, which comprises aluminum or an aluminum-base alloy as the matrix and an alumina fiber or an alumina-silica fiber having substantially no α-alumina reflection by X-ray diffraction as a reinforcement, said composite material having high tensile strength and high tensile modulus even at a high temperature.

9 Claims, 1 Drawing Figure

COMPOSITE MATERIAL COMPRISING REINFORCED ALUMINUM OR ALUMINUM-BASE ALLOY

This application is a continuation of copending application Ser. No. 548,022, filed on Feb. 7, 1975, abandoned.

The present invention relates to a composite material, which comprises aluminum or an aluminum-base alloy containing an alumina fiber or an alumina-silica fiber as a reinforcement.

With the recent technical development in the aerospace industries and other various industries, there has occurred a demand for more suitable material being lighter and having superior mechanical strength, stiffness and heat resistance.

Such materials may be obtained by reinforcing a metal with a fiber material having a high mechanical strength and a high tensile modulus, and attempts have been made to reinforce aluminum, which is a light and conventional metal, with a fiber material such as boron fiber, carbon fiber, alumina whiskers or the like. Although many efforts have been made to produce such reinforced aluminum, none has succeeded because the fibers so far used are not suitable for reinforcing aluminum. That is, the boron fiber has a diameter of more than 100μ and is inferior in the flexibility and further it easily reacts with aluminum even at a temperature lower than the melting point of the aluminum of the matrix to result in the deterioration of the properties thereof. Accordingly, it is not suitable for producing a composite material. The carbon fiber is easily oxidized and reacts with the aluminum of the matrix, and therefore, the composite material must be prepared at a temperature lower than the melting point of the aluminum in a vacuum or in an atmosphere of an inert gas and further the matrix of the composite material thus obtained is gradually induced to electrolytical corrosion owing to the electroconductivity of the fiber. Moreover, the carbon fiber is hardly wetted with fused aluminum, and therefore, the production of the aluminum reinforced with the fiber is more difficult. The alumina whisker is also hardly wetted with fused aluminum, and therefore, it is difficult to produce the desired composite material having superior mechanical strength with less defects, and further, the alumina whisker itself is expensive and further it is very complicated to align the alumina whisker, since it is a short fiber, in the desired direction which results in high cost for producing the composite material.

Under the circumstances, the present inventors have extensively studied to find a composite material having superior properties. During the extensive studies on the aluminum reinforced with alumina fiber of alumina-silica fiber produced by the present inventors, it has been surprisingly found that these fibers, even without any specific surface treatment, are wetted very easily with fused aluminum or aluminum-base alloy and strongly bond to the matrix metal. That is, according to a scanning electron microscopic photograph of the break section of the composite material comprising the fiber and aluminum or an aluminum-base alloy, the fiber is closely bonded to the aluminum matrix and further no fiber pull-out is observed, which characteristics are not observed for the conventional composite material reinforced with carbon fiber or alumina whisker.

These excellent characteristics of the alumina fiber and alumina-silica fiber of the present invention are very important for obtaining the desired composite material, by which many difficulties encountered with the production of the conventional fiber-reinforced aluminum or aluminum alloy are overcome and the desired reinforced aluminum or aluminum-base alloy having excellent properties can be obtained.

That is, the alumina fiber and alumina-silica fiber produced by the present inventors have excellent mechanical properties, such as a tensile strength of 10 $t/cm^2$ or more and a tensile modulus of 1,500 $t/cm^2$ or more, excellent oxidation resistance and heat resistance and further excellent wettability with a fused aluminum or aluminum-base alloy. Moreover, they can be obtained in the form of flexible continuous fibers and therefore can give the desired composite material having excellent mechanical properties without defects. Besides, the fibers have no electrical conductivity and there is no problem of electrolytical corrosion, and therefore, the composite material produced by using the fibers is not deteriorated for a long time.

An object of the present invention is to provide a reinforced aluminum or aluminum-base alloy having superior mechanical strength and modulus at a wide range of temperature from room temperature to a high temperature and further excellent fatigue characteristics, creep characteristics and impact resistance at a high temperature.

Another object of the invention is to provide an economical production of the excellent reinforced aluminum or aluminum-base alloy by using the alumina fiber or alumina-silica fiber as a reinforcement.

A further object of the invention is to provide a composite material, which comprises aluminum or an aluminum-base alloy containing the alumina fiber or alumina-silica fiber.

These and other objects of the invention will be apparent from the description hereinafter.

According to the present invention, the desired composite material having excellent mechanical properties can be produced by using as a reinforcement an alumina fiber or an alumina-silica fiber having substantially no α-alumina reflection by X-ray diffraction. The preferred one of the alumina fiber and alumina-silica fiber used in the present invention have been developed by the present inventors and are described in the specifications of U.S. Pat. application Ser. No. 443,245, now abandoned.

The alumina fiber and alumina-silica fiber may be produced by spinning a solution of polyaluminoxane or of a mixture of polyaluminoxane and an appropriate amount of a silicon-containing compound and then calcining the resulting precursor fiber. The detail of the production is as follows.

The polyaluminoxane used in the production is a polymer having a structural unit of the formula:

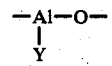

wherein Y is one or more types of groups selected from an alkyl having 1 to 6 carbon atoms (e.g. methyl, ethyl, propyl, or butyl), an alkoxy having 1 to 6 carbon atoms (e.g. ethoxy, propoxy, or butyloxy), a carboxy derivative having 1 to 6 carbon atoms (e.g. formyloxy, acetoxy, propionyloxy butyryloxy, palmitoyloxy, or stearoyloxy), a halogen (e.g. fluorine, or chlorine), hydroxy, phenoxy which may have an appropriate substituent, such as methyl, ethyl, propyl, and the like.

The useful polyaluminoxane may have an alumina content of 10% of more, preferably of 20% or more by weight. The alumina content means the numeral calculated by the following expression:

(51/molecular weight of the structural unit) X 100 (%) and when Y is two or more types of said groups, the molecular weight means the average thereof. When a polyaluminoxane having an alumina content of less than 10% is used, it is very difficult to obtain a practically useful alumina fiber or alumina-silica fiber having excellent strength, even though it is not impossible.

The most preferred Y group may be an alkyl, alkoxy or carboxy derivative each having not more than 4 carbon atoms since a polyaluminoxane having these groups has high alumina content and the precursor fiber made therewith may be easily hydrolyzed as described later.

There is no specific limitation to the degree of polymerization of the polyaluminoxane and two or more degrees of polymerization is enough. However, in view of the ease of the polymerization reaction, the compound having the degree of polymerization of not more than 1,000 may be the preferable one. The more preferable one may be the one having a degree of polymerization of from 10 to 200.

The polyaluminoxane generally dissolves in an organic solvent such as ethyl ether, tetrahydrofuran, dioxane, benzene or toluene to give a viscous solution having large spinnability in an appropriate concentration. The relation between the concentration and the spinnability of the solution may vary in accordance with the kind of the polyaluminoxane, the degree of polymerization thereof, the kind of the solvent and the kind and amount of the silicon-containing compound to be mixed therewith, but it may be preferable to use a solution having a viscosity of from 1 to 5,000 poises at room temperature for the purpose of spinning thereof. Accordingly, the spinning solution must be prepared so that the viscosity thereof becomes within the range as mentioned above. Besides, the polyaluminoxane containing 1 to 20% by mol, preferably 1 to 10% by mol of the residue Y selected from palmitoyloxy and/or stearoyloxy is particularly preferable from the viewpoint of its excellent spinnability.

As the silicon-containing compound to be mixed therewith, there may be preferably used a polyorganosiloxane having a structural unit of the formula:

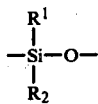

wherein $R^1$ and $R^2$ are the same or different and represent hydrogen, an alkyl group having 1 to 6 carbon atoms (e.g. methyl, ethyl, propyl, and butyl), an alkenyl group having 2 to 6 carbon atoms (e.g. vinyl), an alkoxy group having 1 to 6 carbon atoms (e.g. ethoxy), a phenyl group, chlorine or the like, and a polysilicic acid ester having a structural unit of the formula:

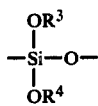

wherein $R^3$ and $R^4$ are the same or different and represent hydrogen, an alkyl group having 1 to 6 carbon atoms (e.g. methyl, ethyl, propyl, and butyl), and alkenyl group having 2 to 6 carbon atoms (e.g. vinyl), a phenyl group, chlorine or the like, but there may be used an organosilane of the formula: $R_n{}^5Si(OR^6)_{4-n}$ wherein $R^5$ and $R^6$ are the same or different and represent hydrogen, an alkyl group having 1 to 6 carbon atoms (e.g. methyl and ethyl), an alkenyl group having 1 to 6 carbon atoms (e.g. vinyl), a phenyl group, chlorine or the like, and n is an integer of 1 to 4; a silicic acid ester of the formula: $Si(OR^7)_4$ wherein $R^7$ is hydrogen, an alkyl group having 1 to 6 carbon atoms, a phenyl group or the like; and any other silicon-containing compound.

The silicon-containing compound to be mixed may be preferably dissolved homogeneously into a solution of the polyaluminoxane, but may be dispersed therein without dissolving. Furthermore, the silicon-containing compound may preferably give a solution having spinnability when it is dissolved in the solution of the polyaluminoxane, but this is not essential.

Further, to the spinning solution there may be preferably added a small amount of one or more kinds of the compounds containing an element such as lithium, beryllium, boron, sodium, magnesium, phosphorus, potassium, calcium, titanium, chromium, manganese, yttrium, zirconium, barium, lanthanum, or tungsten, by which the various characteristics of the alumina fiber or alumina-silica fiber are improved.

When a solution of polyaluminoxane or of a mixture of polyaluminoxane and silicon-containing compound is spun, it may be conveniently carried out by the dry-spinning method, but there may be also used any other conventional methods such as centrifugal pot spinning or blow spinning.

When the spinning is carried out in air, the polyaluminoxane forming the precursor fiber may be gradually hydrolyzed by moisture contained in the air and thereby the organic component may be gradually lost, by which the content of alumina in the precursor fiber may be increased and further the mechanical properties of the alumina fiber or alumina-silica fiber obtained by calcining thereof may be preferably improved. Accordingly, the silicon-containing compound to be mixed may be preferably the one which is easily hydrolyzed, such as a polysilicic acid ester. Furthermore, it may be preferable to contact positively the precursor fiber with a steam atmosphere or an acidic aqueous solution to promote the hydrolysis mentioned above.

The precursor fiber produced by the present process may usually have an average diameter of 1 to 600μ but is not limited thereto. The alumina or alumina-silica precursor fiber is composed in a homogeneous and continuous state wherein the alumina or silica forming materials are contained in a high concentration, and therefore it is very effective for improving the various characteristics of the final product, i.e., the alumina fiber of alumina-silica fiber.

The alumina or alumina-silica precursor fiber obtained by contacting with moisture is not molten by heat, and therefore may be calcined in an atmosphere containing molecular oxygen gas, for instance in air, to give readily the desired alumina fiber or alumina-silica fiber without losing the fiber form thereof. The precursor fiber may be substantially changed to alumina fiber or alumina-silica fiber by calcining at about 700° C. in an atmosphere containing oxygen, e.g. in air, and gives the desired alumina fiber or alumina-silica fiber which is transparent and has an excellent strength by calcining at about 1,000° C.

That is, when the precursor fiber is calcined in an atmosphere containing oxygen e.g. in air, it loses water and the organic components by the time the temperature reaches about 600° C., and the fiber strength then increases by raising the calcining temperature. However, when a pure alumina fiber containing no silica is calcined, the fiber-forming γ-alumina phase is transformed into the α-alumina phase at about 1,000° to 1,100° C., by which the fiber strength may be significantly decreased. On the other hand, when an alumina fiber containing silica is calcined, the transformation temperature may be moved to a higher temperature with increase of the silica content thereof, and in case of the silica content being 25 to 28% by weight, the transformation temperature is about 1,550° C.

In order to obtain an alumina-silica fiber having excellent strength, the calcination temperature may be lower than the transformation temperature indicated above.

The phases forming the fiber at a temperature of from 1,000° C. to the transformation temperature may be the γ-alumina phase, amorphous silica and mullite phase in case of the silica content being not more than 28% by weight. These phases may be transformed at the transformation temperature or higher temperature into the α-alumina phase and mullite phase.

Accordingly, the alumina fiber or alumina-silica fiber having a large fiber strength which contains 100 to 72% by weight of alumina ($Al_2O_3$) and 28 to 0% by weight of silica ($SiO_2$) must be substantially observed as having no α-alumina reflection by X-ray diffraction.

When the alumina fiber or alumina-silica fiber satisfies these conditions, the mechanical properties of the pure alumina fiber having no silica are tensile strength: about 10 to 15 $t/cm^2$ and tensile modulus: about 1,000 to 1,500 $t/cm^2$ in case of the fiber diameter being 10μ. These numerical values increase with increase of the silica content, and when the silica content is about 10 to 25% by weight, the tensile strength and the tensile modulus become about 25 to 30 $t/cm^2$ and about 2,500 to 3,500 $t/cm^2$, respectively.

According to the above process, it is possible to produce an alumina-silica fiber having a high silica content, for instance a silica content of 50% by weight. However, the preferred alumina fiber or alumina-silica fiber used in the present invention has an alumina content of 72 to 100% by weight, preferably 76 to 98% by weight and a silica content of 0 to 28% by weight, preferably 2 to 24% by weight. When the silica content is less than 2% by weight, the fiber is somewhat inferior in the mechanical strength, and on the other hand, when the silica content is more than 24% by weight, the fiber is inferior in the wettability with the aluminum or aluminum-base alloy.

The alumina fiber and the alumina-silica fiber obtained by the above process have usually a diameter of from 0.6 to 400μ on an average. When aluminum or an aluminum-base alloy is reinforced with these fibers, the diameter thereof is not restricted. However, when the fiber having a diameter of more than 200μ is used as the reinforcement, it is not easy to prepare a thin, flexible composite sheet product because of the poor flexibility thereof, and on the other hand, when the fiber having an extremely thin diameter is used as the reinforcement, the fiber is consumed by the formation of a reaction product of the fiber with the matrix metal as mentioned below and the effect of reinforcement is lowered. Therefore, the diameter of the fiber used in the present invention is preferably not less than 6μ.

Besides, the alumina fiber and the alumina-silica fiber used in the present invention should have as a characteristic the fact that substantially no α-alumina reflection by X-ray diffraction is observed. Generally, when an inorganic fiber is heated and calcined up to an unfavorably high temperature, the fiber-forming inorganic materials crystallize into small grains which grow as the calcining temperature is raised, and since these grains are only weakly bonded with one another, the fiber becomes brittle, breaking easily at the grain boundaries under stress to induce the significant lowering of the fiber strength. Moreover, with the growth of the crystalline grains, the surface activity of the fibers decreases. When such fiber is used for reinforcing the aluminum, it shows an inferior reinforcing effect because of its inferior wettability and inferior adhesiveness. According to the present inventors' studies, the growth of the crystalline grains is characterized by the appearance of an α-alumina reflection in the X-ray diffraction pattern of the alumina or alumina-silica fiber. Accordingly, the alumina fiber and the alumina-silica fiber used in the present invention should be prepared so that no α-alumina reflection appears.

Thus, the alumina fiber and the alumina-silica fiber useful in the present invention have a substantially low crystallinity and comprise substantially γ-alumina, amorphous silica and a slight amount of microcrystalline mullite. The surface of the fibers is comparatively active, and when a composite material is produced therefrom, an extremely thin layer of the reaction product of the fiber with the matrix (aluminum) is formed at the interface thereof, which may cause the excellent wettability of the fiber with the aluminum or aluminum-base alloy.

The metals to be reinforced by the present invention include commercially available aluminum or aluminum-base alloy containing one or more kinds of metals selected from the group consisting of beryllium, cobalt, chromium, copper, iron, magnesium, manganese, nickel, silicon, tin, titanium, zinc and zirconium.

As explained above, the excellent wettability of the present alumina fiber or alumina-silica fiber with aluminum or aluminum-base alloy is due to the low crystallinity, and therefore, any alumina fiber or alumina-silica fiber produced by any other process may be used unless it shows an α-alumina reflection by X-ray diffraction. For instance, the useful fibers may be produced by calcining the following filaments or fibers at a temperature lower than the temperature at which α-alumina is formed, for instance, filaments prepared by mixing an aluminum-containing compound (e.g. alumina sol or aluminum salt) and a silicon-containing compound (e.g. silica sol or ethyl silicate) with a solution of an organic high molecular weight compound (e.g. polyethylene oxide or polyvinyl alcohol) and spinning the resulting viscous solution; filaments prepared by mixing a silicon-containing compound with an aqueous solution of an aluminum salt of a carboxylic acid, concentrating the solution and spinning the resulting viscous solution; or organic fibers prepared by dipping organic fibers in a solution of an aluminum salt and a solution containing silicon and thereby impregnating aluminum and silicon thereto.

The volume amount of the alumina fiber or alumina silica fiber in the composite material according to the present invention is 5 to 80%, preferably 30 to 60% by volume.

The composite material comprising a matrix of aluminum or an aluminum-base alloy and a reinforcement selected from the alumina fiber and the alumina-silica fiber may be produced by any conventional method which has been used for the production of a composite material by using a boron fiber or a carbon fiber as the reinforcement, for instance, impregnation with a fused matrix, a hot press of the fiber coated with the matrix, foil metallurgy, powder metallurgy, hot rolling, or the like. Particularly, since the present alumina fiber and alumina-silica fiber are chemically and thermally very stable, the impregnation with a fused matrix is effectively applicable, and therefore, the desired composite material having excellent mechanical strength with the least defects can be easily produced.

Owing to the excellent stabilities of the alumina fiber and the alumina-silica fiber, the desired composite material can be produced even at a temperature higher than the melting point of the matrix, and therefore, the composite material of the present invention has a larger volume fraction of the reinforcement but less defects in comparison with that produced by using the conventional boron fiber or carbon fiber, which is one of the characteristics of the present invention. The alumina fiber and the alumina-silica fiber may optionally be used together with the other conventional fibers such as boron fiber and carbon fiber.

The aluminum or aluminum-base alloy reinforced by the alumina fiber or alumina-silica fiber of the present invention has usually a density of 2.6 to 2.8 g/cm$^3$, a tensile strength of 2 to 13 t/cm$^2$ and a tensile modulus of 800 to 2,000 t/cm$^2$, which values almost do not vary at a temperature of 20° to 500° C.

The present invention is illustrated by the following Examples but is not limited thereto.

EXAMPLE 1

The used alumina-silica fibers, which are produced by the present inventors, comprise 90% by weight of $Al_2O_3$ and 10% by weight of $SiO_2$ wherein no α-alumina reflection is observed by X-ray diffraction and have a fiber diameter of 12μ, a tensile strength of 30.1 t/cm$^2$, a tensile modulus of 3,050 t/cm$^2$ and a density of 3.1 g/cm$^3$. The fibers are bundled in the length of 120 mm and the bundles thus obtained are put in an alumina tube having an inside diameter of 8 mm. One end of the alumina tube is dipped into fused aluminum having a purity of 99.9%, which is kept at 800° C. in an atmosphere of argon gas, and the pressure in the alumina tube is gradually reduced by sucking from the other end thereof, by which the fused aluminum is sucked up through the alumina tube to impregnate the fibers therewith. The whole system is gradually cooled to solidify the aluminum to give a unidirectionally reinforced aluminum pole.

According to the above process, various composite materials having a volume fraction of fiber of 5, 10, 20, 30, 40 or 50% are produced, on which the tensile strength and the tensile modulus are measured at room temperature. The results are shown in FIG. 1.

As is made clear from the FIG. 1, the tensile strength and the tensile modulus of the composite materials increase approximately linearly with the increase of the volume fraction of fiber, and when the volume fraction of fiber is 50%, the reinforced aluminum thus obtained has excellent mechanical properties, such as a tensile strength of 11.9 t/cm$^2$, a tensile modulus of 1,800 t/cm$^2$ and a density of 2.8 g/cm$^3$. According to the scanning electron microscopic photograph of the break section of the composite material, no fiber pull-out is observed, which means that the fibers are closely bonded with the aluminum.

EXAMPLE 2

The alumina-silica fibers as used in Example 1 are laid in parallel with each other like a sheet and piled mutually and repeatedly with an aluminum foil having a purity of 99.5% and a thickness of 0.05 mm in a carbon mold, so that the volume fraction of fiber in the formed composite material is 45%. The resultant is pressed for 5 minutes at 620° C. under a pressure of 120 kg/cm$^2$ in a vacuum of 10$^{-4}$ Torr. The composite material thus obtained is cut to give a dumbbell specimen having a total length (in fiber direction) of 60 mm, a length of the parallel part of 7 mm, a width of 5 mm and a thickness of 3 mm, on which the tensile strength is measured in a vacuum. As the results, the composite material shows a tensile strength of 9.8, 9.8, 9.1 and 8.4 t/cm$^2$ at room temperature, 300° C., 400° C., and 550° C., respectively.

EXAMPLE 3

In the similar manner as described in Example 1, a composite material having a volume fraction of fiber of 50% is produced by using a matrix of aluminum-base alloy consisting of 3.7% by weight of copper, 1.5% by weight of magnesium, 2.0% by weight of nickel and 92% by weight of aluminum. The composite material thus obtained shows a tensile strength of 12.5 t/cm$^2$ and a tensile modulus of 1,740 t/cm$^2$ at 360° C. in air.

What is claimed is:

1. A composite material, which consists essentially of aluminum or an aluminum base alloy reinforced with alumina fibers or alumina-silica fibers produced by spinning a solution of a polyaluminoxane or of a mixture of a polyaluminoxane and at least one silicon-containing compound in an organic solvent and then calcining the resulting precursor fibers, said polyaluminoxane having the structural unit of the formula:

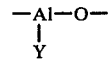

wherein Y is at least one member selected from the group consisting of alkyl, alkoxy, formyloxy, acetoxy, propionyloxy, butyryloxy, palmitoyloxy, stearoyloxy, halogen, hydroxy and phenoxy which may have a substituent thereon, and the resulting alumina fibers or alumina-silica fibers consisting essentially of 72 to 100% by weight of alumina and 0 to 28% by weight of silica and having no α-alumina reflection as observed by X-ray diffraction.

2. The composite material according to claim 1, wherein the amount of the alumina fiber or alumina-silica fiber is 5 to 80% by volume.

3. The composite material according to claim 1, wherein the amount of the alumina fiber or alumina-silica fiber is 30 to 60% by volume.

4. The composite material according to claim 1, wherein the aluminum-base alloy contains at least one other metal selected from the group consisting of beryllium, cobalt, chromium, copper, iron, magnesium, manganese, nickel, silicon, tin, titanium, zinc and zirconium.

5. The composite material according to claim 1, wherein the solution of polyaluminoxane or of a mixture of polyaluminoxane and silicon-containing compound further contains a small amount of at least one compound containing an element selected from the group consisting of lithium, beryllium, boron, sodium, magnesium, phosphorus, potassium, calcium, titanium, chromium, manganese, yttruim, zirconium, barium, lanthanum and tungsten.

6. The composite material according to claim 1, wherein the polyaluminoxane has 20% by weight or more of alumina content as calculated by the following expression:

$$\text{Alumina content} = \frac{51}{\text{molecular weight of the structural unit } (-\underset{Y}{\text{Al}}-\text{O}-)} \times 100\%$$

wherein Y is at least one member selected from the group consisting of alkyl, alkoxy, formyloxy, acetoxy, propionyloxy, butyryloxy, palmitoyloxy, stearoyloxy, halogen, hydroxy and phenoxy which may have a substituent thereon, and when Y represents two or more kinds of said members, the molecular weight is an average thereof.

7. The composite material according to claim 1, wherein the silicon-containing compound is a polyorganosiloxane having the structural unit of the following formula:

$$-\underset{R_2}{\overset{R^1}{\text{Si}}}-\text{O}-$$

wherein $R^1$ and $R^2$ are the same or different and represent hydrogen, an alkyl group having 1 to 6 carbon atoms, an alkenyl group having 2 to 6 carbon atoms, an alkoxy group having 1 to 6 carbon atoms, a phenyl group or chlorine.

8. The composite material according to claim 1, wherein the silicon-containing compound is a polysilicic acid ester having the structural unit of the formula:

$$-\underset{OR^4}{\overset{OR^3}{\text{Si}}}-\text{O}-$$

wherein $R^3$ and $R^4$ are the same or different and represent hydrogen, an alkyl group having 1 to 6 carbon atoms, an alkenyl group having 2 to 6 carbon atoms, a phenyl group or chlorine.

9. A composite marerial, which consists essentially of aluminum or an aluminum base alloy reinforced with alumina fibers or alumina-silica fibers produced by spinning a solution of a polyaluminoxane or of a mixture of a polyaluminoxane and at least one silicon-containing compound in an organic solvent and then calcining the resulting precursor fibers, said polyaluminoxane having the structural unit of the formula:

$$-\underset{Y}{\text{Al}}-\text{O}-$$

wherein Y is at least one member selected from the group consisting of alkyl, alkoxy, formyloxy, acetoxy, propionyloxy, butyryloxy, palmitoyloxy, stearoyloxy, halogen, hydroxy, and phenoxy which may have a substituent thereon, and the resulting alumina fibers or alumina-silica fibers consisting essentially of 0 to 28% by weight of silica and having no α-alumina reflection as observed by X-ray diffraction, said composite material having fibers free from surface treatment and being free from an additive for preventing the corrosion of the fibers with aluminum or for improving the wettability of the fibers with aluminum.

* * * * *